United States Patent [19]

Grunke et al.

[11] Patent Number: 5,006,419
[45] Date of Patent: Apr. 9, 1991

[54] STRUCTURAL COMPONENT MADE OF A TITANIUM ALLOY AND COVERED BY A PROTECTIVE COATING AND METHOD FOR PRODUCING THE COATING

[75] Inventors: Richard Grunke, Munich; Lothar Peichl, Dachau; Franz Puchinger, Niederscheyern; Gerhard Wydra, Oberschleissheim, all of Fed. Rep. of Germany

[73] Assignee: MTU Motoren-und Turbinen-Union Muenchen GmbH, Munich, Fed. Rep. of Germany

[21] Appl. No.: 485,044

[22] Filed: Feb. 26, 1990

[30] Foreign Application Priority Data

Feb. 28, 1989 [DE] Fed. Rep. of Germany ....... 3906187
Aug. 8, 1989 [DE] Fed. Rep. of Germany ....... 3926151

[51] Int. Cl.⁵ .............................................. B32B 15/04
[52] U.S. Cl. .................................... 428/623; 428/632; 428/651; 428/660
[58] Field of Search ............... 428/660, 651, 610, 621, 428/622, 623, 624, 632, 633

[56] References Cited

U.S. PATENT DOCUMENTS

| | | | |
|---|---|---|---|
| 2,858,600 | 11/1958 | Vigor | 428/660 |
| 3,471,342 | 10/1969 | Wood | 428/610 |
| 3,765,954 | 10/1973 | Tokuda et al. | 428/610 |
| 4,024,303 | 5/1977 | Hahn | 428/660 |
| 4,137,370 | 1/1979 | Fujishiro et al. | 428/660 |
| 4,238,551 | 12/1980 | Lal et al. | 428/660 |
| 4,305,998 | 12/1981 | Manty et al. | 428/660 |
| 4,350,719 | 9/1982 | Baldi | 428/651 |
| 4,741,975 | 5/1988 | Naik et al. | 428/660 |
| 4,935,193 | 6/1990 | Grunke et al. | 148/13.1 |
| 4,936,927 | 6/1990 | Grunke et al. | 148/13.1 |

FOREIGN PATENT DOCUMENTS 3321231 12/1984 Fed. Rep. of Germany .
3742944 10/1988 Fed. Rep. of Germany .

*Primary Examiner*—John J. Zimmerman
*Attorney, Agent, or Firm*—W. G. Fasse; D. H. Kane, Jr.

[57] ABSTRACT

A structural component of titanium or titanium alloy is provided with a protective coating made substantially of an oxidation resistant and diffusion inhibiting base layer (2), an intermediate layer (3) forming a titanium fire inhibiting layer, and a cover layer (4) forming a passivating sealing layer. These layers are applied by various methods.

8 Claims, 1 Drawing Sheet

STRUCTURAL COMPONENT MADE OF A TITANIUM ALLOY AND COVERED BY A PROTECTIVE COATING AND METHOD FOR PRODUCING THE COATING

FIELD OF THE INVENTION

The invention relates to a structural component made of a titanium alloy which is covered by a protective coating. The invention also relates to a method for producing such a protective coating.

BACKGROUND INFORMATION

Titanium alloys are preferred materials for the construction of propulsion plants, such as aircraft engines and the like, due to the advantageous strength to weight ratio, especially with regard to the vibratory material strength and the weight of the titanium alloys. The operational temperature for such alloys, however, is limited because at temperatures exceeding 550° C. a pronounced oxidation and corrosion set in. So-called titanium fires may be caused by local overheating, whereby the material combusts and discharges glowing titanium particles which may partially even be in the form of a flowing melt. Such titanium fires also have the tendency to spread.

German Patent Publication (DE) 3,742,944 discloses a method for producing a coating for protecting against oxidation, by diffusion of aluminum and niobium into the surface of the titanium for protecting the titanium against oxidation. Simultaneously, the diffusion forms intermetallic phases which harden the material surfaces so that the wear and tear characteristics are improved. Incidentally, German Patent Publication 3,742,944 corresponds to U.S. Ser. No. 07/283,745, filed on Dec. 13, 1988, now U.S. Pat. No. 4,935,193. Although the diffusion coating or the aluminizing of the titanium structural components results in an effective oxidation prevention, there is room for improvement with regard to some brittleness that is caused by a surface hardening due to said intermetallic phases. Such brittleness could reduce the vibratory material strength up to 30% compared to the same material without such intermetallic surface hardening phases.

Further, the oxidation preventing coating according to the just mentioned German Patent Publication 3,742,944 is not intended to provide protection against titanium fires, nor against the spreading of titanium fires by means of aluminized protective coatings. Similar considerations apply to wear and tear resistant protective coatings according to German Patent Publication 3,321,231 in which nickel is diffused into the base material of titanium, whereby the nickel forms intermetallic phases with the titanium and these intermetallic phases are rather wear resistant, however, they are also brittle. Such brittleness is undesirable. Further, platinum coatings or layers on structural components made of titanium are also known for corrosion protection purposes. However, such platinum coatings also do not provide an effective protection against titanium fires.

The above mentioned conventional protective coatings are very thin, the thickness is generally less than 2 μm and these conventional layers are hard. As a result, there is the danger that even a minimal mechanical influence removes the protective coating, thereby exposing the base material in small micro-surface areas. If such bared surface areas are exposed to localized overheating as may occur, for example, in compressors of gas turbines, a titanium fire may be caused and the resulting droplets of titanium melt are hurled through the compressor due to the high flow speed. The travelling titanium melt droplets may damage other titanium surfaces downstream of the initial titanium fire so that damaged structural components may burn altogether which may lead to the shut-down of the entire propulsion plant.

OBJECTS OF THE INVENTION

In view of the foregoing it is the aim of the invention to achieve the following objects singly or in combination:

to provide a multi-function protection coating on structural components of titanium or titanium alloys which avoid the above outlined problems;

to provide a protective multi-layer coating which is capable of preventing or at least retarding titanium fires and which is oxidation resistant as well as diffusion inhibiting;

to assure that the advantageous strength to weight ratio of titanium alloys is maintained even for the vibration material strength of such alloys;

to make sure that the present coating provides a smooth surface on the coated structural component;

to avoid with the present coatings the formation and discharge of combustible and toxic phosphorus hydrogen compounds;

to control the useful life of the protective coating, especially with regard to wear and tear by the thickness of the protective coating; and to provide advantageous methods for the formation of the present coatings

SUMMARY OF THE INVENTION

A protective coating according to the invention comprises several layers. The first layer in contact with the surface of the structural component is a diffusion inhibiting, oxidation resistant base layer of metals and/or salts. The second layer in contact with the base layer is a titanium fire inhibiting intermediate layer made of a high temperature resistant lacquer containing aluminum, e.g. Al-powder. The third, outermost layer is a passivating cover layer, which may form simultaneously a seal.

The protective coating according to the invention has several advantages. One of the more important advantages is seen in that the individual protection functions are performed by the separate different layers forming the protective coating. Thus, each layer can be formed with its particular purpose in mind. Additionally, all three layers form a protective coating which has the desirable advantageous characteristics such as corrosion resistance, erosion resistance, resistance against wear and tear, and resistance against chloride. Each individual layer by itself on a titanium surface would not have the combined effects just enumerated. These combined effects are achieved only by the interaction of the several layers with one another.

If a titanium fire should occur due to a localized overheating on a microsized surface area of the titanium structural component, the relatively thick intermediate layer according to the invention will extinguish the fire. The intermediate layer according to the invention is made substantially of aluminum. For extinguishing a titanium fire, layer thicknesses for the intermediate layer made of a high temperature resistant aluminum lacquer in the range of 10 to 2000 μm have been found to be effective. It is possible to select the layer thickness for any particular zone of the compressor or the like, with due regard to an experience value providing information regarding the degree or likelihood of a titanium fire in any particular zone. Thus, in zones especially endangered by a titanium fire, such as grooves, seams, and notches exposed to high temperature loads, will have a thicker intermediate, diffusion inhibiting layer than zones exposed to smaller temperature loading.

It has been found that the disadvantageous brittling of the titanium surface can be prevented by a diffusion inhibiting layer immediately on the titanium surface because atoms such as nickel or aluminum atoms, cannot pass through the diffusion barrier. As a result, additional intermetallic phases with the titanium cannot be formed on the surface of the titanium base material. Thus, according to the invention, the advantageous ratio between the material strength under vibratory operating conditions and the weight of titanium alloys is maintained.

Preferred diffusion barriers on the titanium surface are formed by titanium phosphates and titanium chromates because these compounds can be formed by means of phosphoric acid and chromic acid. The resulting salts advantageously prevent a diffusion of aluminum or nickel. Due to the interaction between these salts and the metals in the surface zone of the titanium alloy, a diffusion inhibiting and oxidation resisting layer is advantageously formed.

According to another preferred embodiment of the invention the diffusion barrier is formed as a diffusion inhibiting layer made of at least one of the following elements: molybdenum, tantalum, tungsten, palladium, niobium, or platinum. These transition metals have the advantage that they are resistant to oxidation or that they form oxidation resistant coatings in an oxide containing environment so that the titanium surface is advantageously protected against an undesirable oxidation.

In order that such diffusion inhibiting layers remain ductile and elastic, and so that the material strength characteristic of the titanium alloy is not impaired, the diffusion inhibiting layers have a thickness within the range of about 0.2 to about 10 μm, preferably within the range of 0.2 to 2.0 μm. By coating the titanium fire inhibiting layer with a cover layer, preferably of chromium phosphate, the titanium fire inhibiting layer is advantageously passivated and sealed, whereby it is protected against chemical corrosion, for example, by chloride. Another advantage of such a cover layer is its smoothing effect by filling any remaining pores in the titanium fire inhibiting intermediate layer. The cover layer preferably has a thickness within the range of about 1.0 to about 10.0 μm, whereby the layer is still capable to advantageously smooth surface irregularities, such as pores and waviness of a depth or amplitude of up to 50 μm.

A cover layer, preferably made of silicates or titanium oxides, or silicon oxides with high temperature resistant pigments has the advantage that it is free of phosphates and thus the danger is avoided that combustible and toxic phosphorus hydrogen compounds are formed or discharged. Another advantage is seen in that the starting substances for the cover layer, namely silicate, titanate, or silicon oxide, can preferably be used as a binder of the lacquer which is formed as an anorganic high temperature lacquer comprising aluminum for the high temperature protection layer. Thus, the titanium fire inhibiting intermediate layer also remains free of phosphates.

Chromium phosphate and aluminum phosphate in an aqueous solution of chromic acid and polyphosphoric acid is now merely used for the formation of the diffusion inhibiting base layer, preferably made of titanium chromate and titanium phosphate, whereby the chromium phosphate and the aluminum phosphate form the binder for the diffusion inhibiting base layer in the form of an anorganic high temperature resistant lacquer.

The above mentioned sealing that is achieved by the cover layer is also achieved if the cover layer is preferably made of silicates or titanium oxide or silicon oxide, including high temperature resistant pigments for advantageously passivating the titanium fire inhibiting layer. The sealing that is obtained also protects the titanium fire inhibiting layer against chemical corrosion, for example by chlorides or the like. The above mentioned smoothing effect is also achieved by this type of cover layer of silicates or titanium oxides or silicon oxides.

In the above mentioned German Patent Publication 3,321,231 the wear resistance of the titanium or titanium alloy is achieved by hardening the surface with a diffusion layer which reduces the vibration material strength. The invention avoids this problem because the wear and tear resistance of the protective coating according to the invention resides in a layer coating which is relatively thick and ductile and is made substantially of aluminum which wears off instead of the titanium or titanium alloy. By selecting the thickness of the protective coating in accordance with experience values for particular surface areas, the useful life of the protective coating according to the invention is selectable as desired. An additional advantage of the present layer is seen in that it does not impair the vibration material strength, that is, the strength of the material under vibration operating conditions. One method according to the invention for producing the present layer is characterized by the following steps:

(a) producing on the surface of the structural component of titanium or titanium alloy, a diffusion inhibiting and oxidation resistant base layer made of salts and/or metals, (b) applying an anorganic high temperature resistant lacquer layer to the base layer, said lacquer layer being formed on an aluminum basis, e.g. Al-powder in a vehicle, (c) heat treating or annealing the anorganic high temperature resistant lacquer layer to form an intermediate layer which has titanium fire inhibiting characteristics;

(d) applying a cover layer of a chromium phosphate phosphoric acid emulsion on top of the intermediate layer, and (e) drying the emulsion layer to impart a passivating characteristic to the cover layer.

The just outlined method according to the invention is cost efficient and suitable for application in mass production procedures in an advantageous manner.

The diffusion inhibiting and oxidation resistant base layer is preferably formed by first applying an aluminum diffusion layer to the surface of the titanium or titanium alloy component. Next, an anorganic high temperature resistant layer on an aluminum basis including a binder of a chromium phosphate phosphoric acid is applied and predried for about 10 to 20 minutes at a temperature within the range of about 70° C. to about 90° C. Next, in order to form a diffusion inhibiting titanium chromate and titanium phosphate layer on the titanium surface, the component is stored under atmospheric air in a climate controlled chamber for about 8 to 50 hours at a relative humidity of 70 to 90% and at a temperature within the range of room temperature to about 100° C. The high relative humidity, as well as the increased temperature advantageously increase the reaction speed. The aluminum, which is added to the chromic acid and to the phosphoric acid in the anorganic high temperature resistant layer has a catalytic effect for the formation of such layers of titanium chromates and titanium phosphates. The just described method for producing a diffusion inhibiting and oxidation resistant base layer on the titanium alloy surface is very cost efficient because it requires a relatively small plant investment and it is suitable for mass production, provided the climate controlled chamber has a respective storage capacity.

The aluminum diffusion layer is preferably produced in a powder pack cementing operation or in a deposition out of the gas phase or by diffusion of the aluminum out of the high temperature lacquer layer. Each of these methods results in a base layer which is advantageously impervious to oxygen and thus becomes oxidation resistant.

The storage and production times can be substantially reduced in an advantageous modification of the method for producing the diffusion inhibiting and oxidation resistant base layer. This modification involves using instead of the titanium chromate titanium phosphate layer at least one element from the group of molybdenum, tantalum, tungsten, niobium, or platinum on the titanium alloy surface. This element is applied out of the vapor phase or by a sputtering method.

The anorganic high temperature resistant lacquer is preferably applied by dipping or spraying. Both methods are cost effective and easily adaptable to mass production procedures. After its application, the high temperature resistant lacquer layer is predried, preferably within a temperature range of about 70° to about 90° for about 10 to 20 minutes in an air circulating oven in order to reduce the time needed for the annealing and in order to prevent a boiling of the anorganic high temperature lacquer during its annealing or burn-in or curing.

A preferred burn-in or curing temperature is within the range of 250° C. to 350° C. The preferred burn-in time is within the range of about 20 to 60 minutes at a normal atmosphere. After the burn-in or annealing the high temperature resistant lacquer is substantially more stable and temperature resistant up to about 800° C. to form the titanium fire inhibiting intermediate layer.

The cover or top layer for passivating the surface of the titanium fire inhibiting intermediate layer is formed in that first preferably the structural component, already provided with the first and second layer, is dipped into or sprayed with a chromium phosphate kaolin, phosphoric acid emulsion. As mentioned, these methods are amenable and advantageously adaptable to mass production procedures.

The emulsion for the cover layer is composed of the following components in percent by weight: chromium phosphate 2 to 30%, kaolin 3 to 25%, phosphoric acid 3 to 30%, distilled water 20 to 70%. It has been found that this mixture achieves advantageously a high temperature resistance and a corrosion resistant cover layer suitable for temperatures up to about 800° C.

The drying of the emulsion is preferably accomplished in two steps. A predrying is performed for about 10 to 20 minutes at a temperature of about 70° to 90°. A finish drying is then performed for about 20 to 60 minutes at a temperature within the range of 250° to 350° C. in a normal atmosphere. The drying at two temperature stages has the advantage that first the humidity is driven out of the anorganic lacquer without forming bubbles, and the second step makes sure that the seal which is formed, is simultaneously hardened or cured.

Another method according to the invention for the formation of the present protective coating for titanium alloys with a cover layer of silicates or titanium or silicon oxides including high temperature resistant pigments, is performed by the following steps:

(a) producing of a diffusion inhibiting and oxidation resistant base layer made of salt and/or metals, (b) applying an anorganic high temperature lacquer layer on an aluminum basis, e.g. Al-powder in a vehicle, (c) annealing or burning-in the lacquer to form an anorganic high temperature resistant layer which constitutes a titanium fire inhibiting intermediate layer, (d) applying a dispersion of silicate or butyltitanate or silicone resin including high temperature resistant pigments; and (e) drying the dispersion to form a passivating cover layer.

The second method according to the invention advantageously reduces the content of phosphorus in the surface layer zones of the protective coating and can be performed in an even more cost efficient manner since it does not require any special equipment.

The lacquer for forming an anorganic high temperature resistant titanium fire inhibiting intermediate layer comprises, as for the base layer, an aluminum powder in a lacquer base in which the binder is preferably a silicate of sodium, potassium, aluminum, magnesium, zinc or alkyl-silicates or butyltitanates or silicon resins in an aqueous or organic solvent. The advantage of this type of binder is seen in that they are free of phosphorus so that phosphorus hydrogen compounds can neither be formed nor discharged from the titanium fire inhibiting intermediate layer which is primarily made of aluminum.

The lacquer for forming a high temperature lacquer layer free of phosphorus is applied by dipping or spraying having the above mentioned advantages. The so formed layer is air dried and hardened to form an anorganic high temperature resistant lacquer layer. The hardening takes place at room temperature or at temperatures within a range of 100° to 400° C., whereby the air hardening has the advantage that burn-in or annealing ovens are unnecessary. However, an advantage is seen in the fact that the burn-in or annealing can be accomplished in a few minutes in an oven.

The cover layer for passivating the intermediate layer is formed in that first preferably the component is dipped or sprayed with a dispersion of silicate or butyltitanate or silicone resin, each having dispersed therein high temperature resistant pigments. Such high temperature resistant pigments are selected from the group of kaolin, aluminum oxide, zirconium oxide, chromium oxide, present in a range of 3 to 50% by weight, and dispersed in 2 to 30% by weight of a silicate or a butyltitanate or a silicone resin, the remainder being a solvent such as water or an organic solvent.

The dispersion is dried and air hardened at a room temperature for 2 to 20 hours or it may be burned-in at a temperature within the range of 100° C. to 400° C. for 5 minutes to 2 hours. A two-step predrying at the room temperature with a subsequent burn-in may also be performed. The method with two steps at different temperatures has the advantage that the formation of bubbles is prevented and that a smooth sealing surface is formed as mentioned above.

BRIEF DESCRIPTION OF THE DRAWING

The invention will now be described, by way of example, with reference to the single figure of the accompanying drawing, illustrating an example embodiment of the protective coating according to the invention.

DETAILED DESCRIPTION OF PREFERRED EXAMPLE EMBODIMENTS AND OF THE BEST MODE OF THE INVENTION

Figure 1:
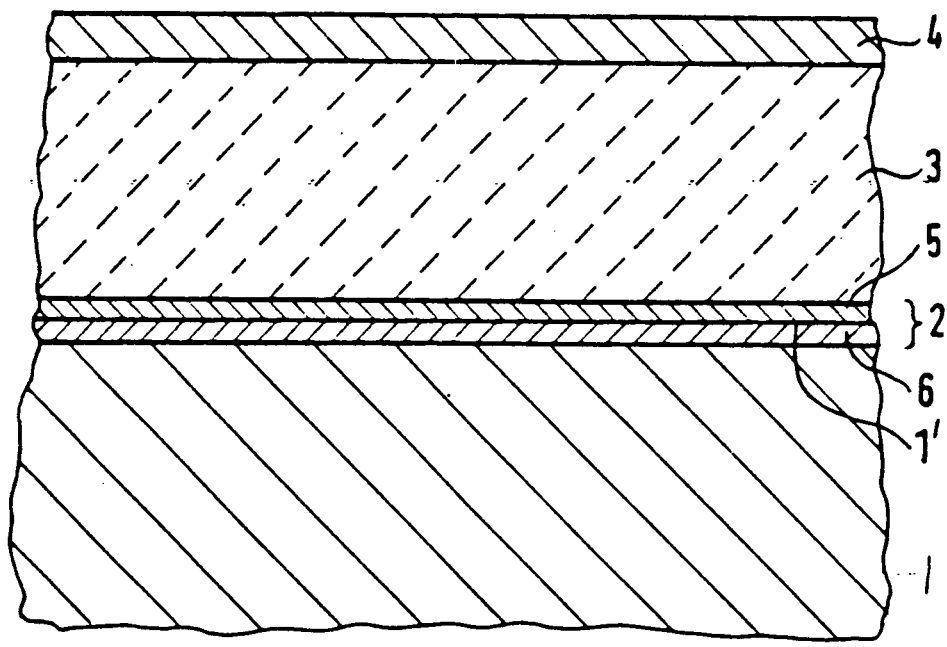

A structural component 1 of a titanium alloy has a surface 1' and a base layer 2 formed in the zone of the surface. More specifically, in this example the base layer 2 comprises two plies, namely an aluminum diffusion ply 6 diffused into the surface of the structural component 1 to a depth of 0.7 mm, and a surface ply 5 of titanium chromate and titanium phosphate having a thickness of 0.3 μm.

An intermediate layer 3 having titanium fire inhibiting characteristics is burned into the surface of the base layer 2. The intermediate layer 3 comprises substantially aluminum with a chromium phosphate binder. The intermediate layer in turn is covered by a cover layer 4 made of chromates and phosphates which form a seal on the intermediate layer to protect the latter against corrosive salts, such as chloride.

The following several example embodiments will further elucidate the method according to the invention for producing the present protective coating on structural components of titanium alloys.

EXAMPLE 1

First, an aluminum diffusion ply 6 is diffused into the surface 1' of the structural component 1 made of a titanium alloy. The diffusion is made out of the gas phase until the diffusion ply 6 has a thickness of about 0.7 μm. After the diffusion is completed the surface 1 contains at least 50% of titanium. Thereafter, the diffusion coated surface is further coated with an anorganic high temperature resistant lacquer forming a ply 5 of an aluminum powder mixed in an emulsion containing the aluminum powder, chromic acid, and phosphoric acid. The applied emulsion ply 5 is predried at a temperature of about 80° for 15 minutes. Thereafter, the so prepared component is stored for 30 hours in a climate controlled chamber at room temperature and at a relative humidity of about 80%. As a result, the ply 5 is formed on the titanium surface having a thickness of 0.3 μm and containing titanium chromate and titanium phosphate. This completes the base layer 2 which functions as an oxidation resistant and diffusion inhibiting layer. Next, a further anorganic high temperature resistant lacquer layer is applied to reinforce the base layer. The further layer is predried at about 80° C. for about 40 minutes. Thereafter, the further layer is burned-in or annealed for about 40 minutes at a temperature of about 300° C. so that a titanium fire inhibiting intermediate layer 3 having a thickness of about 500 μm is formed of aluminum, including a chromium phosphate binder.

The structural component is then prepared at room temperature for the application of the cover layer to seal the surface. The cover layer 4 is applied as a chromium phosphate kaolin phosphoric acid emulsion having about 18% by weight of chromium phosphate, 10% by weight of kaolin, 22% by weight of phosphoric acid and the remainder being distilled water. After a predrying at about 70° C. for about 20 minutes, the emulsion is further dried for 20 minutes at about 350° C., whereby the application of the protective coating is completed.

EXAMPLE 2

First, the base layer 2 is applied as in Example 1. Thereafter, an anorganic high temperature lacquer layer formed on an aluminum basis is reinforced with a potassium silicate binder and is applied on the base layer 2. The applied intermediate layer 3 is predried at room temperature for about 30 minutes to solidify the anorganic lacquer layer. Thereafter, the lacquer layer is burned-in or annealed for 45 minutes at about 350° C. so that a titanium fire inhibiting intermediate layer 3 is formed having a thickness of 500 μm and containing aluminum and aluminum silicate. Thereafter, the surface or cover layer 4 is applied to obtain the above sealing. For this purpose the cover layer 4 is applied at room temperature. The cover layer comprises a dispersion of sodium silicate and kaolin in water, including 15% by weight of sodium silicate and 5% by weight of kaolin, the remainder being distilled water. The so applied cover layer 4 is dried for about 20 minutes at room temperature and then the dispersion is burned-in at a temperature of 220° C. for about 20 minutes. Thus, the application of the protective coating on the titanium alloy is completed.

EXAMPLE 3

First, the base layer 2 is formed by sputtering directly onto the surface of the structural component of titanium alloy to form a layer containing 50% by weight of niobium and 50% by weight of platinum, said layer having a thickness of 0.3 μm. Thereafter, the base layer 2 is covered by an intermediate layer 3 in the form of an anorganic high temperature lacquer formed of an aluminum powder in a solution of 5% by weight of chromic acid, 20% by weight of phosphoric acid, 25% by weight of chromium phosphate, and 3% by weight of aluminum phosphate to form an emulsion. The emulsion layer is dried for about 15 minutes at about 80° C. Thereafter, the so-formed intermediate layer is burned-in in an air circulating oven at a temperature of about 300° C. for about 45 minutes so that the resulting titanium fire inhibiting layer will have a thickness of about 50 μm. The cover layer forming a passivating sealing layer is applied as in Example 1.

EXAMPLE 4

First, a diffusion inhibiting base layer 2 is formed of 50% by weight of niobium and 50% by weight of platinum by directly sputtering these metals onto the surface of the structural component 1 until the layer has a thickness of 0.3 μm. Then, on top of the base layer 2, a lacquer is applied to form an anorganic high temperature resistant layer comprising 50% by weight of aluminum powder in a solution of 15% by weight of potassium silicate, the remainder being water to form a dispersion which is then predried at room temperature for about 15 minutes. The so formed intermediate layer is burned-in in an air circulating oven for 30 minutes at about 300° C.

so that the resulting layer thickness is 50 μm to form a titanium fire inhibiting layer. The final cover layer forming the seal is formed as in Example 1.

EXAMPLE 5

The diffusion inhibiting base layer 2 is formed as a high temperature resistant lacquer layer having a chromium phosphate binder. The component with the base layer 2 is then stored for 24 hours in a humidity controlled environment having a relative humidity of 90% to form a layer of titanium chromate and titanium phosphate on the surface of the structural component 1. The production of the intermediate layer 3 and the cover layer 4 is then performed as in any one of the Examples 1, 2, 3, or 4.

Although the invention has been described with reference to specific example embodiments, it will be appreciated that it is intended to cover all modifications and equivalents within the scope of the appended claims.

What we claim is:

1. A structural component of a titanium or titanium alloy comprising a protective surface coating, said coating comprising a first diffusion inhibiting and oxidation resisting base layer (2) made of a material selected from the group consisting of metals and salts, an intermediate layer (3) for inhibiting a titanium fire, said intermediate layer comprising a high temperature lacquer including aluminum and a binder, and a cover layer (4) forming a passivating seal on said intermediate layer.

2. The structural component of claim 1, wherein said passivating cover layer (4) is made of chromium phosphate.

3. The structural component of claim 1, wherein said passivating cover layer (4) is made of a mixture of materials selected from the group consisting of silicates, titanium oxides, silicon oxides, and pigments.

4. The structural component of claim 1, wherein said base layer (2) is made of intermetallic compounds, preferably $TiAl_3$.

5. The structural component of claim 1, wherein said first base layer (2) comprises titanium phosphate and titanium chromate.

6. The structural component of claim 1, wherein said base layer (2) is made of at least one element selected from the group consisting of molybdenum, tantalum, tungsten, palladium, niobium, and platinum.

7. The structural component of claim 1, wherein the base layer (2) has a thickness within the range of 0.2 to 10.0 μm.

8. The structural component of claim 7, wherein said base layer has a thickness within the range of 0.2 to 2.0 μm.

* * * * *